May 17, 1966  L. E. LEFEVRE  3,251,252
METHOD OF SLITTING THERMOPLASTIC FILMS
Original Filed Aug. 30, 1961
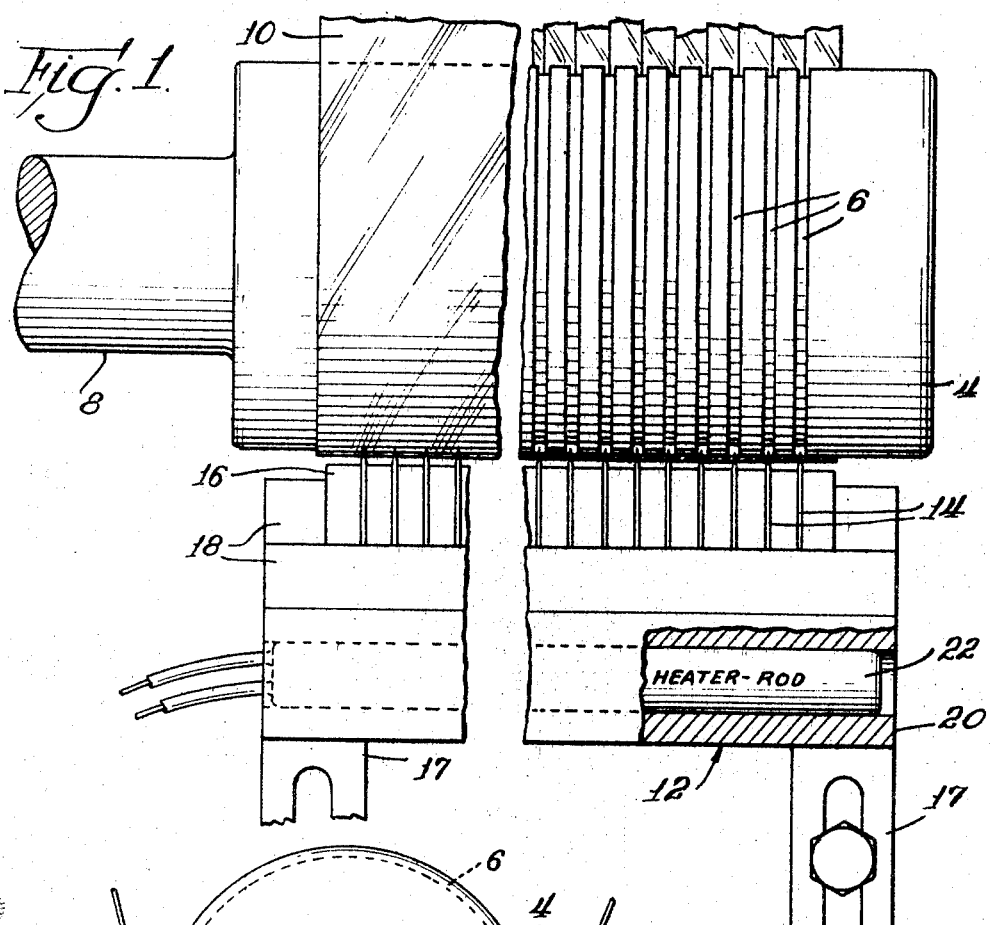
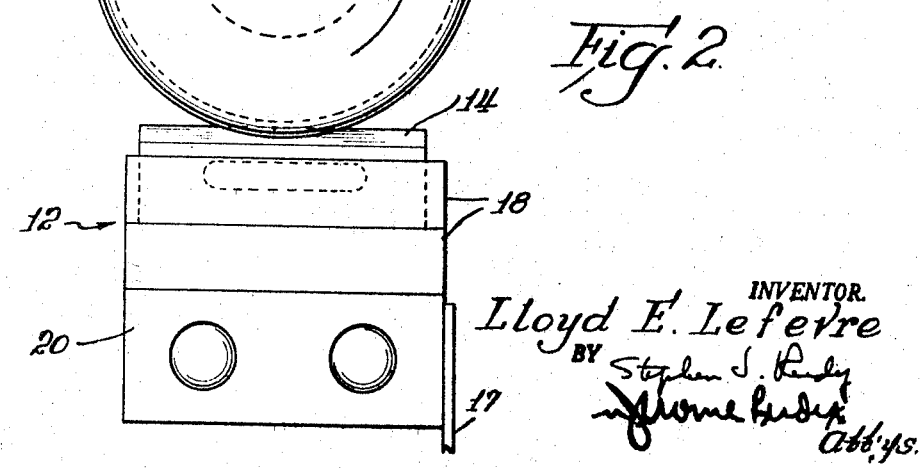
INVENTOR.
Lloyd E. Lefevre

3,251,252
METHOD OF SLITTING THERMOPLASTIC FILMS
Lloyd E. Lefevre, Bay City, Mich., assignor to The Dow Chemical Company, Midland, Mich., a corporation of Delaware
Original application Aug. 30, 1961, Ser. No. 135,059. Divided and this application Mar. 8, 1965, Ser. No. 452,426
4 Claims. (Cl. 83—16)

This is a division of application Serial No. 135,059, filed August 30, 1961, and now abandoned.

This invention relates to the slitting of thermoplastic films especially unoriented pigmented film including film of the polyolefin type, e.g., polypropylene and polyethylene.

The invention is especially suited for production of "microtapes" used in certain types of fabric weaving. The microtapes are prepared by slitting a film into strips or ribbons of desired width, following which the film is oriented. When slitting pigmented film, rapid dulling of the knives is experienced resulting in film having unsmooth edges. If the tape does not have smooth edges, it tends to break during orienting. The problem is especially acute with unoriented polypropylene film which has been found to be difficult to slit satisfactorily with shear slitters.

The method and apparatus of the present invention may be utilized to slit unoriented pigmented thermoplastic film so as to have smooth edges. In addition, it will be found that the slitting knives in the disclosed arrangement will provide comparatively long and satisfactory service, even when used for slitting unoriented pigmented polyolefin film, e.g., polypropylene and polyethylene.

Briefly, the inventive concept involves the use of a plurality of parallel razor-sharp blades which are maintained at an optimum temperature for the film being slit. The blades are arranged to enter grooves formed in a roll, all being spaced so as to slit tapes of desired width.

The main object of this invention is to provide a method and apparatus for the slitting of thermoplastic film.

A more specific object is to provide a method and apparatus for the slitting of unoriented pigmented film of the polyolefin type, e.g., polypropylene and polyethylene.

Another object is to provide a method and apparatus for slitting unoriented pigmented film of the polyolefin type wherein smooth edges will be produced on the slit film.

Still another object of the invention is to provide comparatively long and satisfactory service from slitting knives when slitting unoriented pigmented polyolefin film.

These and further objects and features of the invention will become more apparent from the following description and accompanying drawing wherein:

FIG. 1 is a broken side view of a slitter arrangement illustrative of an embodiment of the invention; and FIG. 2 is an end view of the same.

Referring now to the drawing, numeral 4 identifies a roll having a plurality of parallel arranged and equally spaced grooves 6 extending about the periphery, which roll is adapted to receive a flat film of thermoplastic material 10, passing around the lower portion of the roll as the film moves between other rolls (not shown). The grooves may all be of similar dimension.

A blade assembly 12, positioned beneath the roll 4, includes a plurality of parallel arranged razor-sharp straight-edge knives, or blades 14, which are equally spaced by means of spacer blocks 16 to fit into grooves 6 of the roll 4. The cutting edge of all blades are arranged in the same horizontal plane. An adjusting means 17 is provided for raising and maintaining the blade assembly 12 so that the blades 14 will be positioned within the grooves 6 during a film slitting operation. A holding bar arrangement 18 is provided for maintaining the blades 14 and spacer blocks 16 in assembled condition.

The blade assembly 12 is supported upon a heating block 20, the latter being arranged to contain a pair of horizontally positioned cartridge type heating elements 22 which may be connected to a source of electrical energy (not shown).

In using the slitter arrangement, the temperature of the blades is maintained above the softening point of the film being slit, but below the melting point thereof. Little or no advantage will be gained if the blade temperature is too low, and sticking and ragged edges will result if blade temperature is too high.

As an example of the improved results obtainable with the slitter arrangement of the invention, a conventional slitter was operated at room temperature for slitting unoriented polypropylene film pigmented with 0.5% $TiO_2$. Signs of blade dulling (noted by observing the edges of the slit ribbon) were apparent after twenty-five minutes of operation. After the test was run three and a half hours, the blades were dulled so badly that the ribbons would not be completely severed from each other.

Using the same slitter, but with the blades heated to an indicated temperature of 290° F., unoriented polypropylene film pigmented with 2% $TiO_2$, was still being slit with clean edges after approximately five hours of continuous operation.

In both cases of the example above, the film thickness was in the range of 1.3 to 1.5 mils, and film surface speed was approximately 35.0 feet per minute.

Additional experiments using heated blades for slitting unpigmented polypropylene film, indicated comparable improvement over slitting such film with unheated blades.

It is thus evident that the inventive concept of heating blades for slitting unoriented thermoplastic film, represents a significant improvement over use of unheated slitter blades for such purpose. The improvement is especially applicable to slitting unoriented pigmented polyolefin film, including film made from polypropylene and polyethylene. It will be further evident that the invention disclosed above satisfies all of the objectives set forth hereinbefore.

The foregoing description has been given in detail without thought of limitation since the inventive principles involved are capable of assuming other forms without departing from the spirit of the invention or the scope of the following claims.

What is claimed is:

1. A method of slitting one or more ribbons from a flat film of thermoplastic material comprising the steps of, arranging a plurality of blades with the cutting edges in parallel relationship, heating the blades to maintain a temperature within the softening point of the material but below the melting point thereof to prevent dulling of said blades and to effect a smooth edge on said ribbons, and causing relative movement between the film and the blades in the direction of blade length with the cutting edges of the blades passing through the film.

2. A method of slitting one or more ribbons from a flat film of unoriented pigmented thermoplastic material comprising the steps of, arranging a plurality of razor-sharp straight-edge blades with the cutting edges in parallel relation and in the same plane, heating the blades to maintain a temperature within the softening point of the material but below the melting point thereof to prevent dulling of said blades and to effect a smooth edge on said ribbons, and moving the material past the blades in the direction of blade length with the cutting edge of each blade passing through the film.

3. A method of slitting one or more ribbons from a flat film of thermoplastic material comprising the steps of passing said flat film over a roll formed with parallel peripheral grooves therein, arranging a plurality of razor-sharp straight-edge blades with the cutting edges in parallel relation and in the same plane and each extending into one of the grooves of said roll, heating the blades to maintain a temperature within the softening point of the material but below the melting point thereof to prevent dulling of said blades and to effect a smooth edge on said ribbons, and moving the material past the blades in a direction of blade length with the cutting edge of each blade passing through the film.

4. The method of claim 3 wherein said flat film of unoriented pigmented thermoplastic material comprises unoriented polypropylene film pigmented with $TiO_2$ and wherein said temperature comprises approximately 290° F.

No references cited.

ANDREW R. JUHASZ, *Primary Examiner.*

WILLIAM W. DYER, JR., *Examiner.*

J. L. SEITCHIK, *Assistant Examiner.*